(12) United States Patent
Brandenburg et al.

(10) Patent No.: US 6,818,730 B2
(45) Date of Patent: Nov. 16, 2004

(54) PROCESS TO PRODUCE POLYESTERS WHICH INCORPORATE ISOSORBIDE

(75) Inventors: Charles J. Brandenburg, Wilmington, DE (US); Richard Allen Hayes, Brentwood, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/134,136

(22) Filed: Apr. 26, 2002

(65) Prior Publication Data

US 2003/0204029 A1 Oct. 30, 2003

(51) Int. Cl.$^7$ .......................... C08G 63/02; C08F 20/26
(52) U.S. Cl. .................................. 528/298; 525/444
(58) Field of Search ........................... 525/444; 528/298

(56) References Cited

U.S. PATENT DOCUMENTS

| | | | |
|---|---|---|---|
| 4,418,174 A | 11/1983 | Dhein et al. | |
| 5,179,143 A | 1/1993 | Konig et al. | |
| 5,958,581 A | 9/1999 | Khanarian et al. | |
| 5,959,066 A | 9/1999 | Charbonneau et al. | |
| 6,063,464 A | 5/2000 | Charbonneau et al. | |
| 6,063,465 A | 5/2000 | Charbonneau et al. | |
| 6,063,495 A | 5/2000 | Charbonneau et al. | |
| 6,126,992 A | 10/2000 | Khanarian et al. | |
| 6,140,422 A | * 10/2000 | Khanarian ................ | 525/176 |

FOREIGN PATENT DOCUMENTS

| | | |
|---|---|---|
| DE | 1263981 | 3/1968 |
| WO | WO 9625449 | 8/1996 |
| WO | WO 9714739 | 4/1997 |

OTHER PUBLICATIONS

D. Braun et al, Die Angewandte Makromolekulare Chemie, Polyesters with 1.4:3.6–Dianhydrosorbitol as Polymeric Plasticizers for PVC, vol. 199 PP 191–201 (1992).

Mustapha Majdoub et al., Eur.Polym. J., Nouveaux Polyethers et Polyesters a Base D'isosorbide: Synthese et Caracterisation, vol. 30 No. 12 PP1431–1437 (1994).

Masahiko Okada et al., J.Appl. Polym.Sci., Biodegradable Polymers Based on Renewable Resources.III.Copolyesters. Composed of 1,4.3–6Dianhydro–D–Glucitol, 1, 1 BIS(5 Carboxy 2Furyl)Ehtane and Aliphatic Dicarboxylic Acid Units.vol. 74 No. 14 PP3342–3350 (1999).

Masahiko Okada et al.,J.Appl.Poly.Sci., Biodradable Polymers Based on Resources.Iv.Enzymatic Degradation of Polyesters Composed of 1,4:3.6–Dianhydro–D–Glucitol and Alipphatic Dicarboxylic Acid Moieties., vol. 77 No. 2 PP338–436 (1999).

Masahiko Okada et al., Journal of Poly.Sci:Part A:Polym. Chem., Synthesis and Degradabilities of Polyesters from 1,4:3,6–Dianhydrohexitols and Aliphatic Dicarboxylic Acids., vol. 33 PP 2813–2820 (1995).

Masahiko Okada et al., Journal of Polymer Sci.: Part A: Polymer Chem.,Biodgradable Polymers Based on Renewable Resources. II.Synthesis and Biodegradability of Polyesters Containing Furan Rings. vol. 35 PP2729–2737 (1997).

R.Storbeck et al.,J.Appl.Polymer Sci.,Synthesis and Thermal Analysis of Copolyesters Deriving From 1,4:3,6–Dianhydrosorbitol,Ethylene Glycol,and Terephthalic Acid. vol. 59 PP1199–1202 (1996).

R.Storbeck et al.,Makromol.Chem. Synthesis and Properties of High–Molecular–Weight Polyesters Based on 1,4:3,6–Dianhydrohextiols and Terephthalic Acid., vol. 194 PP 53–64 (1993).

Masahiko Okada et al., Am.Chem.Soc.,Div.Poly.Chem., Struture–Biodegradability Relationship of Polyesters Containing Furan Rings vol. 39 No. 20 PP 152–153 (1998).

Masahiko Okada et al., J.Appl.Polym.Sci.,Biodgradable Polymers Based on Renewable Resources:Polyesters Composed of 1,4:3,6–Dianhydrohexitol and Aliphatic Dicarboxylic Acid Units.vol. 62 No. 13 PP 2257–2265 (1996).

D. Braun et al., Prakt.Chem., 1,4:3,6–Dianhydrohexite als Bausteine fur Polymere. vol. 334 PP 298–310 (1992).

Hans R. Dricheldorf Macromol. Chem.Phys., "Sugar Diol" as Building Blocks of Polycondensates. vol. C37 No. 4 PP 599–631 (1997).

G.Fleche et al., Starch/Starke Isosorbide Preparation, Properties and Chemisrty vol. 38 No. 1 PP 26–30 (1986).

Masahiko Okada et al., Stud.Poly.Sci., Biodegradable Palstics and Polymers Based on 1,4:3,6–Dianhydrohexitols and Succinic Acid Dervatives vol. 12 PP 511–518 (1994).

* cited by examiner

*Primary Examiner*—Jeffrey B. Robertson

(57) ABSTRACT

The present invention provides a process to produce isosorbide-containing polyesters. The process allows for higher isosorbide incorporation than previously found while maintaining high polymeric molecular weights.

7 Claims, No Drawings

PROCESS TO PRODUCE POLYESTERS WHICH INCORPORATE ISOSORBIDE

FIELD OF THE INVENTION

The present invention provides a process to produce isosorbide-containing polyesters. Said process allows for higher isosorbide incorporation than previously found while maintaining high polymeric molecular weights.

TECHNICAL BACKGROUND OF THE INVENTION

There is much interest in using polymeric components derived from biomass. The diol 1,4:3,6-dianhydro-D-sorbitol, hereinafter referred to as isosorbide, is readily made from renewable resources, such as sugars and starches. For example, isosorbide can be made from D-glucose by hydrogenation followed by acid-catalyzed dehydration. The preparation of isosorbide is known within the literature in, for example, G. Fleche, et. al., Starch/Starke, 38(1), pp. 26–30 (1986).

Isosorbide has been incorporated as a monomer into aliphatic and aromatic polyesters. A recent review is found in Hans R. Kricheldorf, et. al., J. M. S.-Rev. Macromol. Chem. Phys., C37(4), pp. 599–631 (1997). Homoaliphatic polyesters produced from isosorbide and aliphatic dicarboxylic acid chlorides were prepared by D. Braun, et. al., Die Angewandte Makromolekulare Chemie 199, pp. 191–201 (1992). The low molecular weight materials were utilized as polymeric plasticizers for PVC. Homopolyesters derived from isosorbide with adipoyl and succinoyl chloride are reported in Mustapha Majdoub, et. al., Eur. Polym. J., Vol. 30, No. 12, pp. 1431–1437 (1994). In a series of papers, Masahiko Okada, et. al., describe the synthesis and biodegradability of a series of aliphatic polyesters which incorporate isosorbide. The synthesis and biodegradability of poly(isosorbide succinate) derivatives was described in Masahiko Okada, et. al., Stud. Polym. Sci., (1994); Masahiko Okada, et. al., 12 (Biodegradable Plastics and Polymers), pp. 511–518. A series of aliphatic polyesters which incorporate isosorbide and their respective biodegradabilities was described in Masahiko Okada, et. al., Journal of Poly. Sci.: Part A: Polym. Chem., vol. 33, pp. 2813–2820 (1995); Masahiko Okada, et. al., J. Appl. Polym. Sci., 62(13), pp. 2257–2265 (1996); and Masahiko Okada, et. al., J. Appl. Polym. Sci., 77(2), pp. 338–346 (2000). In addition, copolymers of isosorbide with a mixture of aliphatic dicarboxylic acids and certain furan dicarboxylic acids are reported by Masahiko Okada, et. al., Journal of Polymer Science: Part A: Polymer Chemistry, Vol. 35, pp. 2729–2737 (1997); Masahiko Okada, et. al., Polym. Prepr. (Am. Chem. Soc., Div. Poly. Chem.) 39(20), pp. 152–153 (1998); and Masahiko Okada, et. al., J. Appl. Polym. Sci., 74(14), pp. 3342–3350 (1999).

Aromatic polyesters which incorporate isosorbide monomer units are also known. Mention is made again of Mustapha Majdoub, et. al., Eur. Polym. J., Vol. 30, No. 12, pp. 1431–1437 (1994), who describe homopolyesters derived from isosorbide and terephthaloyl chloride. See also, for example, R. Storbeck, et. al., Makromol. Chem., Vol. 194, pp. 53–64 (1993); R. Storbeck, et. al., Polymer, Vol. 34, p. 5003 (1993). However it is generally believed that secondary alcohols such as isosorbide have poor reactivity and are sensitive to acid-catalyzed reactions. See, for example, D. Braun, et. al., J. Prakt. Chem., Vol. 334, pp. 298–310 (1992). As a result of the poor reactivity, polyesters made with an isosorbide monomer and esters of terephthalic acid are expected to have a relatively low molecular weight. Ballauff, et. al., Polyesters (Derived from Renewable Sources), Polymeric Materials Encyclopedia, Vol. 8, p. 5892 (1996).

Copolymers containing isosorbide moieties, ethylene glycol moieties, and terephthaloyl moieties have been reported only rarely. A copolymer containing these three moieties, in which the mole ratio of ethylene glycol to isosorbide was about 90:10, was reported in published German Patent Application No. 1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the conditions, which were described only in general terms in the publication, would not have given a polymer having a high molecular weight.

Copolymers of these same three monomers were described again recently, where it was observed that the glass transition temperature Tg of the copolymer increases with isosorbide monomer content up to about 200° C. for the isosorbide terephthalate homopolymer. The polymer samples were made by reacting terephthaloyl dichloride in solution with the diol monomers. This method yielded a copolymer with a molecular weight that is apparently higher than was obtained in the German Patent Application described above but still relatively low when compared against other polyesters polymers and copolymers. Further, these polymers were made by a solution polymerization and were thus free of di(ethylene glycol) as a product of polymerization. See R. Storbeck, Dissertation, Universitat Karlsruhe (1994); R. Storbeck, et. al., J. Appl. Polymer Science, Vol. 59, pp. 1199–1202 (1996).

U.S. Pat. No. 4,418,174 describes a process for the preparation of polyesters useful as raw materials in the production of aqueous stoving laquers. The polyesters are prepared with an alcohol and an acid. One of the many preferred alcohols is dianhydrosorbitol. However, the average molecular weight of the polyesters is from 1,000 to 10,000 and no polyester actually containing a dianhydrosorbitol was made.

U.S. Pat. No. 5,179,143 describes a process for the preparation of compression molded materials. Also, described therein are hydroxyl containing polyesters. These hydroxyl containing polyesters are listed to include polyhydric alcohols, including 1,4:3,6-dianhydrosorbitol. Again, however, the highest molecular weights reported are relatively low, i.e.; 400 to 10,000, and no polyester actually containing the 1,4:3,6-dianhydrosorbitol moiety was made.

WO 97/14739 and WO 96/25449 describe cholesteric and nematic liquid crystalline polyesters that include isosorbide moieties as monomer units. Such polyesters have relatively low molecular weights and are not isotropic.

Recently, aromatic polyesters which incorporate isosorbide monomer units with relatively high molecular weights have been reported. Khanarian, et. al., in U.S. Pat. No. 5,958,581, describe polyester films which are produced from polyesters which incorporate terephthaloyl moieties, and optionally one or more other aromatic diacid moieties, ethylene glycol moieties, isosorbide moieties, and optionally one or more other diol moieties, said polyester having an inherent viscosity of at least 0.35 dL/g when measured as a 1% (weighvvolume) solution of the polyester in o-chlorophenol at a temperature of 25° C.

Charbonneau, et. al., in U.S. Pat. No. 5,959,066, describe a method for producing a polyester comprising a terephthaloyl moiety; optionally, one or more other aromatic diacid moiety; and ethylene glycol moiety, and isosorbide moiety, and optionally one or more other diol moiety, such that the resultant polyester has an inherent viscosity of at least about 0.35.

Khanarian, et. al., in U.S. Pat. No. 6,025,061, describe a sheet comprising a polyester comprised of terephthaloyl moieties; optionally, one or more other aromatic diacid moieties; ethylene glycol moieties, isosorbide moieties, and optionally, one or more other diol moieties, such that said resultant polyester has an inherent viscosity of at least 0.35.

Charbonneau, et. al., in U.S. Pat. No. 6,063,464, describe a process to produce polyesters which incorporate isosorbide which have an inherent viscosity of at least 0.35 dL/g when measured as a 1% (weight/volume) solution of the polyester in o-chlorophenol at a temperature of 25° C. They generally teach the use of aromatic and alicyclic diacids. A shortcoming found within this disclosure was the low incorporation rate of the isosorbide monomer. Of the 16 preparative examples included within this disclosure where the percentage of incorporated isosorbide into the polymer could be assessed, the incorporation level of added isosorbide monomer into the as produced polymer ranged from 12 to 70 percent. The average incorporation rate of added isosorbide monomer into the as made polymer was disclosed to be 48 percent. This inefficiency of isosorbide monomer incorporation into the polymer may lead to complex glycol recovery and separation processes.

Charbonneau, et. al., in U.S. Pat. No. 6,063,465, describe a polyester container made from a polyester having ethylene glycol moieties, isosorbide moieties, and terephthaloyl moieties.

Charbonneau, et. al., in U.S. Pat. No. 6,063,495, describe a polyester fiber made from a polyester containing ethylene glycol moieties, isosorbide moieties, and terephthaloyl moieties.

Khanarian, et. al., in U.S. Pat. No. 6,126,992, describe optical articles produced from certain isosorbide-containing transparent polyesters.

The polyester production process of the present invention provides for a higher isosorbide monomer incorporation rate than has been found in the art while maintaining good polymeric molecular weights.

SUMMARY OF THE INVENTION

The current invention is a process to produce polyesters which incorporate isosorbide. The polyesters produced are comprised essentially of 45 to 50 mole percent of a dicarboxylic acid component, 0.1 to 40 mole percent isosorbide, 10 to 49.9 mole percent of a diol component other than ethylene glycol or di(ethylene glycol), and 0 to 5.0 mole percent of a polyfunctional branching agent component.

The process comprises: melt mixing a first polyester which incorporates isosorbide comprised essentially of: 45.0 to 50.0 mole percent of a dicarboxylic acid component; 5.0 to 50.0 mole percent of isosorbide; 0 to 45.0 mole percent of a diol component other than ethylene glycol or di(ethylene glycol); and 0 to 5.0 mole percent of a polyfunctional branching agent component; with a second polyester comprised essentially of: 45.0 to 50.0 mole percent of a dicarboxylic acid component, 45.0–50.0 mole percent of a diol component other than isosorbide; and 0 to 5.0 mole percent of a polyfunctional branching agent component; at a temperature and for a time sufficient to effect transesterification, optionally followed by a finishing process.

DETAILED DESCRIPTION OF THE INVENTION

In the present process the dicarboxylic acid component includes unsubstituted and substituted aromatic, aliphatic, unsaturated, and alicyclic dicarboxylic acids and the lower alkyl esters of dicarboxylic acids having from 2 carbons to 36 carbons. Desirable dicarboxylic acid component include, but are not limited to: terephthalic acid, dimethyl terephthalate, isophthalic acid, dimethyl isophthalate, 2,6-napthalenedicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), oxalic acid, dimethyl oxalate, malonic acid, dimethyl malonate, succinic acid, dimethyl succinate, methylsuccinic acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, dimethyl-1,4-cyclohexanedicarboxylate, 1,3-cyclohexanedicarboxylic acid, dimethyl-1,3-cyclohexanedicarboxylate, 1,1-cyclohexanediacetic acid, metal salts of 5-sulfo-dimethylisophalate, fumaric acid, maleic anhydride, maleic acid, hexahydrophthalic acid phthalic acid and the like and mixtures derived therefrom. Essentially any dicarboxylic acid known within the art may find utility within the present invention.

Said other diol component includes, but is not limited to, unsubstituted, substituted, straight chain, branched, cyclic aliphatic, aliphatic-aromatic or aromatic diols having from 2 carbon atoms to 36 carbon atoms, other than ethylene glycol or di(ethylene glycol), and poly(alkylene ether) glycols with molecular weights between about 250 to 4,000. Specific examples of the desirable other glycol component include 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)tricyclo[5.2.1.0/2.6]decane, 1,4-cyclohexanedimethanol, tri(ethylene glycol), poly(ethylene ether) glycols, poly(butylene ether) glycols and the like and mixtures derived therefrom. Essentially any other diol known within the art may find use within the present invention.

The optional polyfunctional branching agent is useful for increasing melt strength and includes, but is not limited to, any material with three or more carboxylic acid functions, hydroxy functions or a mixture thereof. Specific examples of the desirable polyfunctional branching agent component include 1,2,4-benzenetricarboxylic acid, (trimellitic acid), trimethyl-1,2,4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'- benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, 2-(hydroxymethyl)-1,3-propanediol, 2,2-bis (hydroxymethyl)propionic acid, trimer acid, and the like and mixtures therefrom. Essentially any polyfunctional material which includes three or more carboxylic acid or hydroxyl functions may find use within the present invention. Said polyfunctional branching agent may be included when higher resin melt viscosity is desired for specific end uses. Examples of such end uses include melt extrusion coatings, melt blown films or containers, foam and the like.

To give the desired physical properties, it is desirable for the polyesters which incorporate isosorbide of the present invention to have an inherent viscosity, which is an indicator of molecular weight, of at least equal to or greater than 0.15. More desirably, the inherent viscosity, (IV), of said polyesters which include isosorbide may be at least equal to 0.35 dL/g, as measured on a 0.5 percent (weight/volume) solution of the copolyester in a 50:50 (weight) solution of trifluoroacetic acid:dichloromethane solvent system at room temperature. These inherent viscosities will be sufficient for some applications. Higher inherent viscosities are desirable for many other applications, such as films, bottles, sheet, molding resin and the like. The polymerization conditions may be adjusted to obtain the desired inherent viscosities up to at least about 0.5 dL/g and desirably higher than 0.65 dL/g. Further processing of the polyester may achieve inherent viscosities of 0.7, 0.8, 0.9, 1.0, 1.5, 2.0 dL/g and even higher.

The molecular weight is normally not measured directly. Instead, the inherent viscosity of the polymer in solution or the melt viscosity is used as an indicator of molecular weight. The inherent viscosities are an indicator of molecular weight for comparisons of samples within a polymer family, such as poly(ethylene terephthalate) and poly(butylene terephthalate). The inherent viscosities are used as the indicator of molecular weight herein.

The process of the present invention includes melt mixing a first polyester which incorporates isosorbide with a second polyester at a temperature and for a time sufficient to effect transesterification. Transesterification may be allowed to progress until a completely random copolymer is produced, or only long enough so that a blocky copolymer is formed, or for any length of time in between. The blockiness of the polymer may be gauged by the degree of crystallinity relative to the two extremes. Optionally, the resulting polyester may be further finished to a higher molecular weight.

Said first polyester is meant to include any polyester which incorporates isosorbide and does not incorporate ethylene glycol or di(ethylene glycol). Said first polyester which incorporates isosorbide is comprised essentially of: 45.0 to 50.0 mole percent of a dicarboxylic acid component:
  5.0 to 50.0 mole percent of isosorbide; 0 to 45.0 mole percent of adiol component other than ethylene glycol or di(ethylene glycol); and 0 to 5.0 mole percent of a polyfunctional branching agent component.

The dicarboxylic acid component includes, but is not limited to, unsubstituted and substituted aromatic, aliphatic, unsaturated, and alicyclic dicarboxylic acids and the lower alkyl esters of dicarboxylic acids having from 2 carbons to 36 carbons. Specific examples of the desirable dicarboxylic acid component include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), oxalic acid, dimethyl oxalate, malonic acid, dimethyl malonate, succinic acid, dimethyl succinate, methylsuccinic acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, dimethyl-1,4-cyclohexanedicarboxylate, 1,3-cyclohexanedicarboxylic acid, dimethyl-1,3-cyclohexanedicarboxylate, 1,1-cyclohexanediacetic acid, metal salts of 5-sulfo-dimethylisophalate, fumaric acid, maleic anhydride, maleic acid, hexahydrophthalic acid phthalic acid and the like and mixtures derived therefrom. Essentially any dicarboxylic acid known within the art may find utility within the present invention.

Said other diol component includes, but is not limited to, unsubstituted, substituted, straight chain, branched, cyclic aliphatic, aliphatic-aromatic or aromatic diols having from 2 carbon atoms to 36 carbon atoms and poly(alkylene ether) glycols with molecular weights between about 250 to 4,000. Specific examples of the desirable other glycol component include 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis (hydroxymethyl)tricyclo[5.2.1.0/2.6]decane, 1,4-cyclohexanedimethanol, tri(ethylene glycol), poly(ethylene ether) glycols, poly(butylene ether) glycols and the like and mixtures derived therefrom. Essentially any other diol known within the art may find use within the present invention.

The optional polyfunctional branching agent includes, but is not limited to, any material with three or more carboxylic acid functions, hydroxy functions or a mixture thereof. Specific examples of the desirable polyfunctional branching agent component include 1,2,4-benzenetricarboxylic acid, (trimellitic acid), trimethyl-1,2,4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, 2-(hydroxymethyl)-1,3-propanediol, 2,2-bis (hydroxymethyl)propionic acid, trimer acid, and the like and mixtures therefrom. Essentially any polyfunctional material which includes three or more carboxylic acid or hydroxyl functions may find use within the present invention. Said polyfunctional branching agent may be included when higher resin melt viscosity is desired for specific end uses. Examples of said end uses may include melt extrusion coatings, melt blown films or containers, foam and the like.

Preferably, the first polyester of the present invention incorporates greater than 10 mole percent isosorbide. More preferably, the first polyester of the present invention incorporates greater than 25 mole percent isosorbide. Most preferably, the first polyester of the present invention incorporates greater than 45 mole percent isosorbide.

Said first polyester which incorporates isosorbide of the present invention preferably has an inherent viscosity, which is an indicator of molecular weight, of at least equal to or greater than 0.05. More desirably, the inherent viscosity, (IV), of said first polyesters which include isosorbide will be at least equal to 0.10 dL/g, as measured on a 0.5 percent (weight/volume) solution of the copolyester in a 50:50 (weight) solution of trifluoroacetic acid:dichloromethane solvent system at room temperature.

The first polyester of the present invention may be prepared by conventional polycondensation techniques. The product compositions may vary somewhat based on the method of preparation used, particularly in the amount of diol that is present within the polymer. These methods include the reaction of the diol monomers with the acid chlorides. For example, acid chlorides of the dicarboxylic acid component may be combined with the isosorbide and the other glycol component in a solvent, such as toluene, in the presence of a base, such as pyridine, which neutralizes the hydrochloric acid as it is produced. Such procedures are known. See, for example, R. Storbeck, et. al., in *J. Appl. Polymer Science,* Vol. 59, pp. 1199–1202 (1996). Other well known variations using acids chlorides may also be used, such as the interfacial polymerization method, or the monomers may simply be stirred together while heating.

When the polymer is made using acid chlorides, the ratio of the monomer units in the product polymer is about the same as the ratio of reacting monomers. Therefore, the ratio of monomers charged to the reactor is about the same as the desired ratio in the product. A stoichiometric equivalent of the diol components and the diacid components generally will be used to obtain a high molecular weight polymer.

Preferably, the first polyester which incorporates isosorbide of the present invention will be produced through a melt polymerization method. In the melt polymerization method, the dicarboxylic acid component, (either as acids, esters, or mixtures thereof), the isosorbide, the other diol component and optionally the polyfunctional branching agent, are combined in the presence of a catalyst to a high enough temperature that the monomers combine to form esters and diesters, then oligomers, and finally polymers. The polymeric product at the end of the polymerization process is a molten product. Generally, the other diol component and the isosorbide are volatile and distill from the reactor as the polymerization proceeds. Such procedures are known. See, for example, Charbonneau, et. al., in U.S. Pat. No. 6,063,464 and the references cited therein, which are herein incorporated by reference.

The melt process conditions of the present invention, particularly the amounts of monomers used, depend on the polymer composition that is desired. The amount of isosorbide, other diol component, dicarboxylic acid component, and branching agent are desirably chosen so that the final polymeric product contains the desired amounts of the various monomer units, desirably with equimolar amounts of monomer units derived from the respective diol and diacid components. Because of the volatility of some of the monomers, especially some of the other diol components and isosorbide, and depending on such variables as whether the reactor is sealed, (i.e.; is under pressure), the polymerization temperature ramp rate, and the efficiency of the distillation columns used in synthesizing the polymer, some of the monomers may need to be included in excess at the beginning of the polymerization reaction and removed by distillation as the reaction proceeds. This is particularly true of the other diol component and of isosorbide.

The exact amount of monomers to be charged to a particular reactor is readily determined by a skilled practitioner, but often will be in the ranges below. Excesses of the diacid, other diol, and isosorbide are often desirably charged, and the excess diacid, other diol and isosorbide is desirably removed by distillation or other means of evaporation as the polymerization reaction proceeds. Isosorbide is desirably charged at a level 0 to 100 percent greater than the desired incorporation level in the final polymer. The other diol component is desirably charged at a level 0 to 100 percent greater than the desired incorporation level in the final product. For examples of the other diol component which are volatile under the polymerization conditions, such as 1,3-propanediol, or 1,4-butanediol, 30 to 100 percent excesses are desirably charged. For less volatile examples of the other diol component, such as dimer diol, no excesses need be desirably charged.

The ranges given for the monomers are very wide because of the wide variation in the monomer loss during polymerization, depending on the efficiency of distillation columns and other kinds of recovery and recycle systems and the like, and are only an approximation. Exact amounts of monomers that are charged to a specific reactor to achieve a specific composition are readily determined by a skilled practitioner.

In the polymerization process, the monomers are combined, and are heated gradually with mixing with a catalyst or catalyst mixture to a temperature in the range of 230° C. to about 300° C., desirably 250° C. to 295° C. The exact conditions and the catalysts depend on whether the diacids are polymerized as true acids or as dimethyl esters. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a high enough molecular weight to be suitable for producing the polyesters of the present invention.

Catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner. The preferred catalyst and preferred conditions differ depending on, for example, whether the diacid monomer is polymerized as the free diacid or as a dimethyl ester and the exact chemical identity of the other diol component.

Polymers can be made by the melt condensation process above having adequate inherent viscosity for the process of the present invention. Solid state polymerization may be used to achieve even higher inherent viscosities (molecular weights).

The product made by melt polymerization, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight.

The polymer may also be crystallized prior to solid state polymerization by treatment with a relatively poor solvent for polyesters which induces crystallization. Such solvents reduce the glass transition temperature (Tg) allowing for crystallization. Solvent induced crystallization is known for polyesters and is described in U.S. Pat. No. 5,164,478 and U.S. Pat. No. 3,684,766, which are incorporated herein by reference.

The semicrystalline polymer is subjected to solid state polymerization by placing the pelletized or pulverized polymer into a stream of an inert gas, usually nitrogen, or under a vacuum of 1 Torr, at an elevated temperature, but below the melting temperature of the polymer for an extended period of time.

The second polyester of the present invention is comprised essentially of: 45.0 to 50.0 mole percent of a dicarboxylic acid component; 45.0 to 50.0 mole percent of a diol component, other than isosorbide; and 0–5.0 mole percent of a polyfunctional branching agent component.

The dicarboxylic acid component is includes, but is not limited to, unsubstituted and substituted aromatic, aliphatic, unsaturated, and alicyclic dicarboxylic acids and the lower alkyl esters of dicarboxylic acids having from 2 carbons to 36 carbons. Specific examples of the desirable dicarboxylic acid component include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), oxalic acid, dimethyl oxalate, malonic acid, dimethyl malonate, succinic acid, dimethyl succinate, methylsuccinic acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, dimethyl-1,4-cyclohexanedicarboxylate, 1,3-cyclohexanedicarboxylic acid, dimethyl-1,3-cyclohexanedicarboxylate, 1,1-cyclohexanediacetic acid, metal salts of 5-sulfo-dimethylisophalate, fumaric acid, maleic anhydride, maleic acid, hexahydrophthalic acid phthalic acid and the like and mixtures derived therefrom. Essentially any dicarboxylic acid known within the art may find utility within the present invention.

The diol component includes, but is not limited to, unsubstituted, substituted, straight chain, branched, cyclic aliphatic, aliphatic-aromatic or aromatic diols having from 2 carbon atoms to 36 carbon atoms and poly(alkylene ether) glycols with molecular weights between about 250 to 4,000. Specific examples of the desirable other glycol component include isosorbide, ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)tricyclo[5.2.1.0/2.6]decane, 1,4-cyclohexanedimethanol, di(ethylene glycol), tri(ethylene glycol), poly(ethylene ether) glycols, poly(butylene ether) glycols and the like and mixtures derived therefrom. Essentially any diol, other than isosorbide, known within the art may find use within the present invention.

The optional polyfunctional branching agent includes but is not limited to, any material with three or more carboxylic acid functions, hydroxy functions or a mixture thereof. Specific examples of the desirable polyfunctional branching agent component include 1,2,4-benzenetricarboxylic acid, (trimellitic acid), trimethyl-1,2,4-benzenetricarboxylate, 1,2,4-benzenetricarboxylic an hydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, 2-(hydroxymethyl)-1,3-propanediol, 2,2-bis (hydroxymethyl)propionic acid, trimer acid, and the like and mixtures therefrom. Essentially any polyfunctional material which includes three or more carboxylic acid or hydroxyl functions may find use within the present invention. Said polyfunctional branching agent may be included when higher resin melt viscosity is desired for specific end uses. Examples of said end uses may include melt extrusion coatings, melt blown films or containers, foam and the like.

It is preferred for second polyesters of the present invention to have an inherent viscosity, which is an indicator of molecular weight, of at least equal to or greater than 0.30. More desirably, the inherent viscosity, (IV), of said second polyesters will be at least equal to 0.50 dL/g, as measured on a 0.5 percent (weight/volume) solution of the copolyester in a 50:50 (weight) solution of trifluoroacetic acid:dichloromethane solvent system at room temperature. These inherent viscosities will be sufficient to produce the final polyester of the present invention for some applications. Higher inherent viscosities are desirable for many other applications, such as films, bottles, sheet, molding resin and the like. The polymerization conditions may be adjusted to obtain the desired inherent viscosities up to at least about 0.5 and desirably higher than 0.65 dL/g. Further processing of the polyester may achieve inherent viscosities of 0.7, 0.8, 0.9, 1.0, 1.5, 2.0 dL/g and even higher.

The second polyesters of the present invention may be prepared by conventional polycondensation techniques. The product compositions may vary somewhat based on the method of preparation used, particularly in the amount of diol that is present within the polymer. These methods include the reaction of the diol monomers with acid chlorides. For example, acid chlorides of the dicarboxylic acid component may be combined with the diol component in a solvent, such as toluene, in the presence of a base, such as pyridine, which neutralizes the hydrochloric acid as it is produced. Such procedures are known. See, for example, R. Storbeck, et. al., in *J. Appl. Polymer Science,* Vol. 59, pp. 1199–1202 (1996). Other well known variations using acid chlorides may also be used, such as the interfacial polymerization method, or the monomers may simply be stirred together while heating.

When the polymer is made using acid chlorides, the ratio of the monomer units in the product polymer is about the same as the ratio of reacting monomers. Therefore, the ratio of monomers charged to the reactor is about the same as the desired ratio in the product. A stoichiometric equivalent of the diol components and the diacid components generally will be used to obtain a high molecular weight polymer.

Preferably, the second polyesters of the present invention will be produced through a melt polymerization method. In the melt polymerization method, the dicarboxylic acid component, (either as acids, esters, or mixtures thereof), the diol component and optionally the polyfunctional branching agent, are combined in the presence of a catalyst to a high enough temperature that the monomers combine to form esters and diesters, then oligomers, and finally polymers. The polymeric product at the end of the polymerization process is a molten product. Generally, the diol component is volatile and distills from the reactor as the polymerization proceeds. Such procedures are known. See, for example, U.S. Pat. Nos. 3,563,942, 3,948,859, 4,094,721, 4,104,262, 4,166,895, 4,252,940, 4,390,687, 4,419,507, 4,585,687, 5,053,482, 5,292,783, 5,446,079, 5,480,962, and U.S. Pat. No. 6,063,464 and the references cited therein, which are herein incorporated by reference.

The melt process conditions of the present invention, particularly the amounts of monomers used, depend on the polymer composition that is desired. The amount of the diol component, dicarboxylic acid component, and branching agent are desirably chosen so that the final polymeric product contains the desired amounts of the various monomer units, desirably with equimolar amounts of monomer units derived from the respective diol and diacid components. Because of the volatility of some of the monomers, especially some of the diol components, and depending on such variables as whether the reactor is sealed, (i.e.; is under pressure), the polymerization temperature ramp rate, and the efficiency of the distillation columns used in synthesizing the polymer, some of the monomers may need to be included in excess at the beginning of the polymerization reaction and removed by distillation as the reaction proceeds. This is particularly true of the diol component.

The exact amount of monomers to be charged to a particular reactor is readily determined by a skilled practitioner, but often will be in the ranges below. Excesses of the diacid and diol are often desirably charged, and the excess diacid and diol is desirably removed by distillation or other means of evaporation as the polymerization reaction proceeds. The diol component is desirably charged at a level 0 to 100 percent greater than the desired incorporation level in the final product. For examples of the diol component which are volatile under the polymerization conditions, such as ethylene glycol, 1,3-propanediol, or 1,4-butanediol, 30 to 100 percent excesses are desirably charged. For less volatile examples of the diol component, such as dimer diol, no excesses need be desirably charged.

The ranges given for the monomers are wide because of the wide variation in the monomer loss during polymerization, depending on the efficiency of distillation columns and other kinds of recovery and recycle systems and the like, and are only an approximation. Exact amounts of monomers that are charged to a specific reactor to achieve a specific composition are readily determined by a skilled practitioner.

In the polymerization process, the monomers are combined, and are heated gradually with mixing with a catalyst or catalyst mixture to a temperature in the range of 230° C. to about 300° C., desirably 250° C. to 295° C. The exact conditions and the catalysts depend on whether the diacids are polymerized as true acids or as dimethyl esters. The catalyst may be included initially with the reactants, and/or may be added one or more times to the mixture as it is heated. The catalyst used may be modified as the reaction proceeds. The heating and stirring are continued for a sufficient time and to a sufficient temperature, generally with removal by distillation of excess reactants, to yield a molten polymer having a high enough molecular weight to be suitable for the present invention.

Catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner. The preferred catalyst and preferred conditions differ depending on, for example, whether the diacid monomer is polymerized as the free diacid or as a dimethyl ester and the exact chemical identity of the diol component.

Polymers can be made by the melt condensation process above having adequate inherent viscosity for the present invention. Solid state polymerization may be used to achieve even higher inherent viscosities (molecular weights).

The product made by melt polymerization, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight.

The polymer may also be crystallized prior to solid state polymerization by treatment with a relatively poor solvent for polyesters which induces crystallization. Such solvents reduce the glass transition temperature (Tg) allowing for crystallization. Solvent induced crystallization is known for polyesters and is described in U.S. Pat. Nos. 5,164,478 and 3,684,766, which are incorporated herein by reference.

The semicrystalline polymer is subjected to solid state polymerization by placing the pelletized or pulverized polymer into a stream of an inert gas, usually nitrogen, or under a vacuum of 1 Torr, at an elevated temperature, but below the melting temperature of the polymer for an extended period of time.

The process of the present invention includes mixing together the first polyester and the second polyester at a sufficient temperature and for a sufficient time to form the polyesters which incorporate isosorbide of the present invention.

As is generally taught within the art, in polyester transesterification processes the initial product is generally considered to be a block copolyester, formed from blocks of the two starting polyesters. Said block copolyesters then randomize to form fully random copolyesters. The current invention is meant to include both said block and random copolyesters as the products of the process of the present invention. The process conditions of the present invention, such as time, temperature and catalysts, may be adjusted to allow for the production of either the said block copolyester products or the random copolyester products.

The temperature utilized within the process of the present invention should be sufficient to melt both the first polyester and the second polyester and to allow for a significant reaction rate between first polyester and the second polyester. Generally, the process temperature of the present invention will be within the range of 150° C. to 350° C. Preferably, this process temperature range is between about 220° C. and 300° C.

The time required for the process of the present invention will be a complicated function of the exact chemical identity of the first polyester, the exact chemical identity of the second polyester, the process temperature, the process equipment utilized, the mixing intensity, and the like. An effective amount of time is required by the process of the present invention to provide the products of the present invention. Generally, the process of the present invention will have a time greater than one minute. Preferably, the process time will be greater than 5 minutes. More preferably, the process time will be greater than 20 minutes.

Optionally, added catalysts may be used within the process of the present invention. It has generally been found that the process of the present invention may be performed relying on the residual catalysts incorporated within the first polyester and the second polyester. However, it is contemplated that the use of additional catalysts will increase the rate of the process, if that is desired. Additional catalysts that may be used include salts of Li, Ca, Mg, Mn, Zn, Pb, Sb, Sn, Ge, and Ti, such as acetate salts and oxides, including glycol adducts, and Ti alkoxides. These are generally known in the art, and the specific catalyst or combination or sequence of catalysts used may be readily selected by a skilled practitioner.

The process may be performed in any known equipment in the art. For example, the first polyester, the second polyester and optionally, additional catalysts, may be added to a stirred autoclave and heated to melt said first and second polyesters and mixed at temperature for a sufficient time to effect the process. However, it is further contemplated that the first polyester, the second polyester and optionally, additional catalysts, may be fed to a single- or twin-screw extruder, melted and mixed and, in turn, fed to a transfer line to allow for sufficient time to effect the process of the present invention. Said transfer line may include additional mixing, as through static mixers. Alternatively, the molten mixture exiting the extruder may be fed to a continuous polymerizer, (CP), multi-vessel train. Each vessel would constitute a continuous stirred reactor, (CSR). This should not be considered limiting. Essentially any equipment known within the art which allows for process of the present invention will find utility within the present invention.

Optionally, the process of the present invention includes finishing the as produced product to achieve the desired product molecular weight. This may be performed by sparging the molten product with inert gases, such as nitrogen, or by applying vacuum. Heating under the inert gas sparging or vacuum may be continued until the molten polymer reaches the desired molecular weight, usually recognized by an increase in the melt viscosity to a pre-determined level. This is observed as an increase in the torque needed for the stirring motor to maintain stirring. An inherent viscosity of at least 0.5 dL/g, and generally up to about 0.65 dL/g or greater can be achieved by this melt finishing process without further efforts at raising molecular weight.

Optionally, solid state polymerization may be used to achieve even higher inherent viscosities (molecular weights).

The product made by the process of the present invention, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight.

The polymer may also be crystallized prior to solid state polymerization by treatment with a relatively poor solvent for polyesters which induces crystallization. Such solvents reduce the glass transition temperature (Tg) allowing for crystallization. Solvent induced crystallization is known for polyesters and is described in U.S. Pat. Nos. 5,164,478 and 3,684,766, which are incorporated herein by reference.

The semicrystalline polymer is subjected to solid state polymerization by placing the pelletized or pulverized polymer into a stream of an inert gas, usually nitrogen, or under a vacuum of 1 Torr, at an elevated temperature, but below the melting temperature of the polymer for an extended period of time.

It is understood that the product of the process of the present invention may be used with additives known within the art. Such additives may include thermal stabilizers, for example, phenolic antioxidants, secondary thermal stabilizers, for example, thioethers and phosphites, UV absorbers, for example benzophenone- and benzotriazole-derivatives, UV stabilizers, for example, hindered amine light stabilizers, (HALS), and the like. Said additives may further include plasticizers, processing aides, flow enhancing additives, lubricants, pigments, flame retardants, impact modifiers, nucleating agents to increase crystallinity, anti-blocking agents such as silica and the like. In addition, the products of the process of the present invention may be filled with, for example, wood flour, gypsum, wollastonite, chalk, kaolin, clay, silicon oxide, calcium terephthalate, aluminum oxide, titanium oxide, calcium phosphate, lithium fluoride, cellulose, starch, chemically modified starch, thermoplastic starch, calcium carbonate, reinforcing agents, such as glass, and the like. Said additives and fillers may be added at any stage of the process of the present invention. For example, said additives and fillers may be incorporated within the first polyester or the second polyester.

The products of the process of the present invention will find utility as a wide variety of shaped articles. For example, the products of the process of the present invention will be useful as sheets, as described in U.S. Pat. No. 6,025,061, as containers, as described in U.S. Pat. No. 6,063,464, as films, as described in U.S. Pat. No. 5,958,581, as fiber, as described in U.S. Pat. No. 6,063,495, and as optical articles, as described in U.S. Pat. No. 6,126,992.

EXAMPLES AND COMPARATIVE EXAMPLES

Test Methods

Differential Scanning Calorimetry, (DSC), is performed on a TA Instruments Model Number 2920 machine. Samples are heated under a nitrogen atmosphere at a rate of 20° C./minute to 300° C., programmed cooled back to room temperature at a rate of 20° C./minute and then reheated to 300° C. at a rate of 20° C./minute. The observed sample glass transition temperature, (Tg), and crystalline melting temperature, (Tm), noted below were from the second heat.

Inherent Viscosity, (IV), is defined in "Preparative Methods of Polymer Chemistry", W. R. Sorenson and T. W. Campbell, 1961, p. 35. It is determined at a concentration of 0.5 g./100 mL of a 50:50 weight percent trifluoroacetic acid:dichloromethane acid solvent system at room temperature by a Goodyear R-103B method.

Laboratory Relative Viscosity, (LRV), is the ratio of the viscosity of a solution of 0.6 gram of the polyester sample dissolved in 10 mL of hexafluororisopropanol, (HFIP), containing 80 ppm sulfuric acid to the viscosity of the sulfuric acid-containing hexafluroroisopropanol itself, both measured at 25° C. in a capillary viscometer. The LRV may be numerically related to IV. Where this relationship is utilized, the term "calculated IV" is noted.

Preparative Example PE 1

To a 500 mL three necked flask was charged terephthalic acid, (166.13 grams), isosorbide, (160.75 grams), and antimony(III) oxide, (0.099 grams). The stirred reaction mixture was slowly heated to 285° C. over 3.5 hour under a slight nitrogen purge. The resulting stirred reaction mixture was held at 285° C. for 0.33 hours under a slight nitrogen purge and then heated to 300° C. over 1.33 hours. The reaction mixture was then cooled down to 296° C. and vacuum was then staged on. The reaction was stirred at 296° C. under full vacuum, (pressure <100 millitorr), for 3 hours. The vacuum was then released with nitrogen and the resulting reaction mixture was allowed to cool to room temperature. A total of 23 grams of distillates were collected. 219 grams of the reaction product were recovered.

Differential scanning calorimetry, (DSC) was performed on this product. In the first heating cycle, a glass transition, (Tg), was observed at 165.2° C. and a crystalline melting temperature, (Tm) was observed at 223.1° C., (0.46 J/g). In the second heating cycle, a glass transition, (Tg) was observed at 167.9° C. and no crystalline melting temperature, (Tm), observed.

An inherent viscosity, (IV), of 0.26 dL/g was measured.

Comparative Example CE1

To a 500 mL three necked flask was charged dimethylterephthalate, (194.19 grams), ethylene glycol, (69.52 grams), isosorbide, (87.68 grams), manganese(II) acetate tetrahydrate, (0.0969 grams), and antimony(III) oxide, (0.078 grams). The stirred reaction mixture was slowly heated to 240° C. over 3.25 hours with a slight nitrogen purge. At this temperature, phosphoric acid, (0.256 grams of a 10 weight percent solution of phosphoric acid in ethylene glycol), was added. The resulting stirred reaction mixture was then slowly heated to 295° C. over 1.25 hours under a slight nitrogen purge. The resulting reaction mixture was allowed to stir at 295° C. for 0.25 hours. At this time 67 grams of distillates were collected. Vacuum was then staged on. The reaction mixture was allowed to stir under full vacuum, (pressure<100 millitorr), at 295° C. for 4 hours. The vacuum was then released with nitrogen, the resulting reaction mixture stirred at 295° C. for 0.5 hours and then allowed to cool to room temperature. An additional 66 grams of distillates were collected at this stage. 206 grams of the reaction product were recovered.

Differential scanning calorimetry, (DSC), was performed on this product. In the first heating cycle, a glass transition, (Tg), was observed at 101.2° C. In the second heating cycle, a glass transition, (Tg), was observed at 99.7° C.

This product was subjected to 1H NMR, (nuclear magnetic resonance), experiments in deuterated tetrachloroethylene, (D2-TCE), solvent. If 100 percent of the isosorbide added in the above reaction was incorporated within the polymeric product, the theoretical product would contain 20 mole percent ethylene glycol, 30 mole percent isosorbide and 50 mole percent terephthalic acid residues. The 1H NMR experiments demonstrated that the polymeric product incorporated 34.5 mole percent ethylene glycol, 13.1 mole percent isosorbide, 0.7 mole percent di(ethylene glycol), and 49.1 mole percent terephthalic acid residues.

An inherent viscosity, (IV), of 0.3 dL/g was measured.

Example 1

To a 250 mL three necked flask was charged a poly (ethylene terephthalate) homopolymer with an LRV of 20.3, (calculated IV=0.61 dL/g), (DSC second melt, Tg=84.7° C., Tm=256.1° C., (39.5 J/g)), (28.8 grams), and the product from Preparative Example PE 1, (62.1 grams). The reaction mixture was heated to 285° C. over 1 hour with stirring under a slight nitrogen purge. The resulting reaction mixture was stirred at 285° C. for 1.25 hours under a slight nitrogen purge. Vacuum was then staged on. The reaction mixture was then stirred under full vacuum, (pressure <100 millitorr), at 285° C. for 1.4 hours. The vacuum was then released with nitrogen and allowed to cool to room temperature. No distillates were observed or collected. 62.3 grams of reaction product were recovered.

Differential scanning calorimetry, (DSC), was performed on this product. In the first heating cycle, no thermal transitions were observed. In the second heating cycle, a glass transition, (Tg), was observed at 139.0° C.

This product was subjected to 1H NMR, (nuclear magnetic resonance), experiments in deuterated tetrachloroethylene, (D2-TCE), solvent. If 100 percent of the isosorbide added in the above reaction was incorporated within the polymeric product, the theoretical product would contain 20 mole percent ethylene glycol, 30 mole percent isosorbide, 0.4 mole percent di(ethylene glycol), and 50 mole percent terephthalic acid residues. The 1H NMR experiments demonstrated that the polymeric product incorporated 24.0 mole percent ethylene glycol, 26.3 mole percent isosorbide and 48.4 mole percent terephthalic acid residues.

A laboratory relative viscosity, (LRV), of 18.1 was measured. This suggests a calculated IV of 0.57 dL/g.

Comparative Example CE2

To a 500 mL three necked flask was charged dimethyl terephthalate, (194.19 grams), 1,4-butanediol, (82.01 grams), isosorbide, (87.68 grams) and titanium(IV) isopropoxide, (0.28 grams). The reaction mixture was heated to 220° C. over 1.3 hours with stirring under a slight nitrogen purge. After stirring at 220° C. for 0.5 hour, the reaction mixture was heated to 240° C. over 0.3 hour with stirring under a slight nitrogen purge. After stirring at 240° C. for 0.5 hours, the resulting reaction mixture was heated to 260° C. over 0.75 hour with stirring under a slight nitrogen purge. Vacuum was then staged on. The reaction mixture was allowed to stir under full vacuum, (pressure <100 millitorr), for 4.25 hours at 260° C. The vacuum was then released with nitrogen and the reaction allowed to cool to room temperature. A total of 33 grams of distillates were recovered. 248 grams of the reaction product were recovered.

Differential scanning calorimetry, (DSC), was performed on this product. In the first heating cycle, a glass transition, (Tg), was observed at 38.3° C. and a very broad crystalline melting temperature, (Tm), was centered at 153.6° C., (32.6 J/g). In the second heating cycle, a glass transition, (Tg), was observed at 46.5° C., and a crystalline melting temperature, (Tm), was observed at 157.7° C., (2.8 J/g).

This product was subjected to 1H NMR, (nuclear magnetic resonance), experiments in deuterated tetrachloroethylene, (D2-TCE), solvent. If 100 percent of the isosorbide added in the above reaction was incorporated within the polymeric product, the theoretical product would contain 20 mole percent 1,4-butanediol, 30 mole percent isosorbide and 50 mole percent terephthalic acid residues. The 1H NMR experiments demonstrated that the polymeric product incorporated 30.9 mole percent 1,4-butanediol, 16.0 mole percent isosorbide and 53.1 mole percent terephthalic acid residues.

An inherent viscosity, (IV), of 0.13 dL/g was measured.

Example 2

To a 250 mL three necked flask was charged a poly(butylene terephthalate) with an LRV=58.5 and a calculated IV=1.3 dL/g, (DSC, second melt, Tg=13.4° C., Tm=224.9° C., (29.3 J/g)), (22.0 grams), and the product from Preparative Example PE 1, (41.4 grams). The reaction mixture was heated to 265° C. over 2.75 hours with stirring under a slight nitrogen purge. The resulting reaction mixture was stirred at 265° C. for 0.4 hours under a slight nitrogen purge and was then cooled to 255° C. The reaction mixture was stirred at 255° C. under a slight nitrogen purge for 1.8 hours. Vacuum was then staged on. The resulting reaction mixture was stirred under full vacuum, (pressure <100 millitorr), at 255° C. for 2.25 hours. The vacuum was then released with nitrogen and the reaction was allowed to cool to room temperature. No distillates were observed or collected. 47.6 grams of reaction product were recovered.

Differential scanning calorimetry, (DSC), was performed on this product. In the first heating cycle, a glass transition, (Tg) was observed at 108.7° C., and a crystalline melting temperature, (Tm), was observed at 203.5° C., (0.8 J/g).

This product was subjected to 1H NMR, (nuclear magnetic resonance), experiments in deuterated tetrachloroethylene, (D2-TCE), solvent. If 100 percent of the isosorbide added in the above reaction was incorporated within the polymeric product, the theoretical product would contain 20 mole percent 1,4-butanediol, 30 mole percent isosorbide and 50 mole percent terephthalic acid residues. The 1H NMR experiments demonstrated that the polymeric product incorporated 20.3 mole percent 1,4-butanediol, 27.6 mole percent isosorbide and 52.1 mole percent terephthalic acid residues.

A laboratory relative viscosity, (LRV), of 15.6 was measured. This suggests a calculated IV of 0.53 dL/g.

Preparative Example PE2

To a 500 mL three necked flask was charged isophthalic acid, (166.13 grams), isosorbide, (160.75 grams), and antimony(III) oxide, (0.0992 grams). The reaction mixture was heated to 285° C. over 2.7 hours with stirring under a slight nitrogen purge. The resulting reaction mixture was stirred at 285° C. for 2 hours, during which time 29 grams of distillates were collected. Vacuum was then staged on. The reaction mixture was stirred under full vacuum, (pressure <100 millitorr), for 3.3 hours. The vacuum was then released with nitrogen and allowed to cool to room temperature. An additional 7 grams of distillates were recovered. 194 grams of the reaction product were recovered.

Differential scanning calorimetry, (DSC), was performed on this product. In the first heating cycle, a glass transition, (Tg), was observed at 144.2° C. No crystalline melting temperature was observed. In the second heating cycle, a glass transition, (Tg), was observed at 143.3° C. An inherent viscosity, (IV), of 0.18 dL/g was measured.

Example 3

To a 250 mL three necked flask was charged with a poly(ethylene terephthalate) homopolymer with an LRV of 20.3, (calculated IV=0.61 dL/g), (DSC second melt, Tg=84.7° C., Tm=256.1° C., (39.5 J/g)), (95.0 grams) and the product from Preparative Example PE 2, (5.0 grams). The polymeric mixture was heated to 285° C. over 1.5 hours under a slight nitrogen purge. The stirrer was then started and the resulting molten reaction mixture was stirred at 285° C. with a slight nitrogen purge for 1 hour. Vacuum was then staged on and the resulting reaction mixture was stirred under full vacuum, (vacuum <100 millitorr), for 2 hours at 285° C. The vacuum was then released with nitrogen and the resulting reaction mixture was allowed to cool to room temperature. No distillates were observed. 79 grams of the reaction product were recovered.

Differential scanning calorimetry, (DSC), was performed on this product. In the first heating cycle, a glass transition, (Tg), was observed at 62.3° C., and a crystalline melting temperature, (Tm), was observed at 248.3° C., (31.1 J/g). In the cooling cycle, a crystallization exotherm was observed with an onset temperature of 181.3° C., and a maximum at 157.2° C., (17.4 J/g). In the second heating cycle, a glass transition, (Tg), was observed at 84.9° C., a crystallization exotherm was observed at 158.5° C., (7.1 J/g), and a crystalline melting temperature, (Tm), was observed at 245.5° C., (30.5 J/g).

This product was subjected to 1H NMR, (nuclear magnetic resonance), experiments in deuterated tetrachloroethylene, (D2-TCE), solvent. If 100 percent of the isosorbide added in the above reaction was incorporated within the polymeric product, the theoretical product would contain 48.25 mole percent ethylene glycol, 1.75 mole percent isosorbide, 1.75 mole percent isophthalic acid and 48.25 mole percent terephthalic acid residues. The 1H NMR experiments demonstrated that the polymeric product incorporated 47.1 mole percent ethylene glycol, 1.5 mole percent isosorbide, 0.6 mole percent di(ethylene glycol), 1.6 mole percent isophthalic acid and 48.7 mole percent terephthalic acid residues.

A laboratory relative viscosity, (LRV), of 25.11 was measured. This suggests a calculated IV of 0.70 dL/g.

Example 4

To a 250 mL three neck flask was charged with a poly(ethylene terephthalate) homopolymer with an LRV of 20.3, (calculated IV=0.61 dL/g), (DSC second melt, Tg=84.7° C., Tm=256.1° C., (39.5 J/g)), (80.0 grams) and the product from Preparative Example PE 2, (20.0 grams). The polymeric mixture was heated to 285° C. over 1.5 hours under a slight nitrogen purge. The stirrer was then started and the resulting molten reaction mixture was stirred at 285° C. with a slight nitrogen purge for one hour. Vacuum was then staged on and the resulting reaction mixture was stirred under full vacuum, (vacuum<100 millitorr), for 2.5 hours at 285° C. The vacuum was then released with nitrogen and the resulting reaction mixture was allowed to cool to room temperature. The total distillates collected from this reaction were 0.29 grams. 79 grams of the reaction product were recovered.

Differential scanning calorimetry, (DSC), was performed on this product. In the first heating cycle, a glass transition, (Tg), was observed at 97.2° C., and a crystalline melting temperature, (Tm), was observed at 221.2° C., (2.6 J/g). In the second heating cycle, a glass transition, (Tg), was observed at 94.5° C. A crystalline melting temperature was not observed during the second heating cycle.

This product was subjected to 1H NMR, (nuclear magnetic resonance), experiments in deuterated tetrachloroethylene, (D2-TCE), solvent. If 100 percent of the isosorbide added in the above reaction was incorporated within the polymeric product, the theoretical product would contain 42.6 mole percent ethylene glycol, 7.4 mole percent isosorbide, 7.4 mole percent isophthalic acid and 42.6 mole percent terephthalic acid residues. The 1H NMR experiments demonstrated that the polymeric product incorporated 41.5 mole percent ethylene glycol, 7.3 mole percent isosorbide, 0.5 mole percent di(ethylene glycol), 7.1 mole percent isophthalic acid, and 42.9 mole percent terephthalic acid residues.

A laboratory relative viscosity, (LRV), of 27.04 was measured. This suggests a calculated IV of 0.74 dL/g.

Preparative Example PE3

To a 250 mL three necked flask was charged isosorbide, (73.07 grams), succinic anhydride, (50.04 grams), and titanium(IV) isopropoxide, (0.136 grams). The stirred reaction mixture was heated to 220° C. over 0.5 hours under a slight nitrogen purge. The resulting reaction mixture was stirred at 220° C. under a slight nitrogen purge for 2 hours. The reaction mixture was then heated to 255° C. over 1 hour with a slight nitrogen purge. The reaction mixture was stirred at 255° C. for 1 hour under a slight nitrogen purge. 6.2 grams of distillates were collected during this period. Vacuum was then staged on. The reaction mixture was stirred at 255° C. under full vacuum, (pressure <100 millitorr), for 4 hours. The vacuum was then released with nitrogen and the resulting reaction mixture was allowed to cool to room temperature. An additional 1.2 grams of distillates were collected while the reaction was under vacuum. 92 grams of the reaction product were recovered.

Differential scanning calorimetry, (DSC), was performed on this product. In the first heating cycle, a glass transition, (Tg), was observed at 70° C., and a crystalline melting temperature, (Tm), was observed at 240.7° C., (0.26 J/g). In the second heating cycle, a glass transition, (Tg), was observed at 75° C. A crystalline melting temperature was not observed during the second heating cycle.

A laboratory relative viscosity, (LRV), of 6.10 was measured. This suggests calculated IV of 0.36 dL/g.

Example 5

To a 250 mL three necked reaction flask was charged a poly(butylene terephthalate) with an LRV=58.5 and a calculated IV=1.3 dL/g, (DSC second melt, Tg=13.41° C., Tm=224.9° C., (29.3 J/g)), (82.5 grams) and the product from Preparative Example PE 3, (28.5 grams). The reaction mixture was heated to 285° C. over 3.5 hours with stirring under a slight nitrogen purge. The reaction was stirred at 285° C. for 0.35 hours under a slight nitrogen purge and then cooled to 255° C. The resulting reaction mixture was stirred at 255° C. for 1 hour under a slight nitrogen purge. Vacuum was then staged on. The reaction mixture was stirred under full vacuum, (pressure<100 millitorr), at 255° C. for 4 hours. The vacuum was then released with nitrogen and the resulting reaction mixture was allowed to cool to room temperature. No distillates were observed or collected. 99.32 grams of the reaction product were recovered.

Differential scanning calorimetry, (DSC), was performed on this product. In the first heating cycle, a glass transition, (Tg), was observed at 43.6° C., and a crystalline melting temperature, (Tm), was observed at 165.9° C., (20.2 J/g). In the second heating cycle, a glass transition, (Tg), was observed at 41.9° C., a crystallization exotherm onset was observed at 90.2° C. and was centered at 101.1° C., (15.3 J/g), and a crystalline melting temperature, (Tm), was observed at 162.5° C., (17.4 J/g).

This product was subjected to 1H NMR, (nuclear magnetic resonance), experiments in deuterated tetrachloroethylene, (D2-TCE), solvent. If 100 percent of the isosorbide added in the above reaction was incorporated within the polymeric product, the theoretical product would contain 37.5 mole percent 1,4-butanediol, 12.5 mole percent isosorbide, 12.5 mole succinic acid, and 37.5 mole percent terephthalic acid residues. The 1H NMR experiments demonstrated that the polymeric product incorporated 36.3 mole percent 1,4-butanediol, 13.3 mole percent isosorbide, 11.7 mole percent succinic acid, and 38.7 mole percent terephthalic acid residues.

A laboratory relative viscosity, (LRV), of 34.4 was measured. This suggests a calculated IV of 0.87 dL/g.

What is claimed is:

1. A process to produce polyesters comprising:
   melt mixing a first polyester which incorporates isosorbide comprised essentially of: 45.0 to 50.0 mole percent of a dicarboxylic acid component; 5.0 to 50.0 mole percent of isosorbide; 0 to 45.0 mole percent of a diol component other than ethylene glycol or di(ethylene glycol); and 0 to 5.0 mole percent of a polyfunctional branching agent component;
   with a second polyester comprised essentially of: 45.0 to 50.0 mole percent of a dicarboxylic acid component, 45.0–50.0 mole percent of a diol component other than isosorbide; and 0 to 5.0 mole percent of a polyfunctional branching agent component;
   at a temperature of 150° C.–350° C. for at least one minute to effect transesterifcation, followed by a finishing step to increase the inherent viscosity to at least 0.5 dL/g.

2. The process of claim 1 wherein the dicarboxylic acid component has 2 carbons to 36 carbons.

3. The process of claim 2 wherein the dicarboxylic acid component is selected from the group consisting of unsubstituted and substituted aromatic, aliphatic, unsaturated, and alicyclic dicarboxylic acids and the lower alkyl esters of dicarboxylic acids.

4. The process of claim 1 wherein the dicarboxylic acid component is selected from the group consisting of terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), oxalic acid, dimethyl oxalate, malonic acid, dimethyl malonate, succinic acid, dimethyl succinate, methylsuccinic acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, 1,4-cyclohexanedicarboxylic acid, dimethyl-1,
4-cyclohexanedicarboxylate, 1,3-cyclohexanedicarboxylic
acid, dimethyl-1,3-cyclohexanedicarboxylate, 1,1-
cyclohexanediacetic acid, metal salts of 5-sulfo-
dimethylisophalate, fumaric acid, maleic anhydride, maleic
acid, hexahydrophthalic acid phthalic acid and mixtures
derived therefrom.

5. The process of claim 1 wherein the diol component is
selected from the group consisting of unsubstituted,
substituted, straight chain, branched, cyclic aliphatic,
aliphatic-aromatic and aromatic diols having from 2 carbon
atoms to 36 carbon atoms and poly(alkylene ether) glycols
with molecular weights between about 250 to 4,000, excluding ethylene glycol and di(ethylene glycol).

6. The process of claim 1 wherein the branching agent is
selected from the group consisting of any material with three
or more carboxylic acid functions, hydroxy functions and a
mixture thereof.

7. The process of claim 1 wherein the branching agent is
selected from the group consisting of 1,2,4-
benzenetricarboxylic acid, (trimellitic acid), trimethyl-1,2,
4-benzenetricarboxylate, 1,2,4-benzenetricarboxylic
anhydride, (trimellitic anhydride), 1,3,5-
benzenetricarboxylic acid, 1,2,4,5-benzenetetracarboxylic
acid, (pyromellitic acid), 1,2,4,5-benzenetetracarboxylic
dianhydride, (pyromellitic anhydride), 3,3',4,4'-
benzophenonetetracarboxylic dianhydride, 1,4,5,8-
naphthalenetetracarboxylic dianhydride, citric acid,
tetrahydrofuran-2,3,4,5-tetracarboxylic acid, 1,3,5-
cyclohexanetricarboxylic acid, pentaerythritol,
2-(hydroxymethyl)-1,3-propanediol, 2,2-bis
(hydroxymethyl)propionic acid, trimer acid, and mixtures
therefrom.

* * * * *